(12) United States Patent
Dunn (10) Patent No.: US 11,402,940 B2
(45) Date of Patent: Aug. 2, 2022

(54) MONITORING THE STATUS OF A TOUCHSCREEN

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

(21) Appl. No.: 17/464,569

(22) Filed: Sep. 1, 2021

(65) Prior Publication Data

US 2021/0397292 A1 Dec. 23, 2021

Related U.S. Application Data

(63) Continuation-in-part of application No. 16/799,377, filed on Feb. 24, 2020, now Pat. No. 11,137,847.

(60) Provisional application No. 62/810,155, filed on Feb. 25, 2019.

(51) Int. Cl.
*G06F 3/041* (2006.01)
*G06F 3/044* (2006.01)
*G06F 3/14* (2006.01)

(52) U.S. Cl.
CPC ........... *G06F 3/0416* (2013.01); *G06F 3/044* (2013.01); *G06F 3/14* (2013.01)

(58) Field of Classification Search
CPC ...... G06F 11/2221; G06F 3/0416; G06F 3/14; G06F 3/147
See application file for complete search history.

(56) References Cited

U.S. PATENT DOCUMENTS

| | | |
|---|---|---|
| 5,162,785 A | 11/1992 | Fagard |
| 5,351,201 A | 9/1994 | Harshbarger, Jr. et al. |
| 5,590,831 A | 1/1997 | Manson et al. |
| 5,751,346 A | 5/1998 | Dozier et al. |
| 5,786,801 A | 7/1998 | Ichise |
| 5,952,992 A | 9/1999 | Helms |
| 6,144,359 A | 11/2000 | Grave |
| 6,157,143 A | 12/2000 | Bigio et al. |

(Continued)

FOREIGN PATENT DOCUMENTS

| | | |
|---|---|---|
| AU | 2016321400 B2 | 9/2019 |
| CN | 203277867 U | 11/2013 |

(Continued)

OTHER PUBLICATIONS

Photo Research, PR-650 SpectraScan Colorimeter, 1999, 2 Pages.

(Continued)

*Primary Examiner* — Robin J Mishler
(74) *Attorney, Agent, or Firm* — Standley Law Group LLP; Jeffrey S. Standley; Adam J. Smith (57) ABSTRACT

Systems and methods are provided for monitoring the status of a touchscreen at a display assembly. Signals are transmitted to the touchscreen. Where signals received from the touchscreen are modified in a manner inconsistent with expected touch input, a type and a location of damage to the touchscreen is determined based on the signals received from the touchscreen, and a visual representation is generated at a remote device of the type and the location of the damage at the touchscreen.

24 Claims, 8 Drawing Sheets

(56) References Cited

U.S. PATENT DOCUMENTS

| | | |
|---|---|---|
| 6,215,411 B1 | 4/2001 | Gothard |
| 6,222,841 B1 | 4/2001 | Taniguchi |
| 6,259,492 B1 | 7/2001 | Imoto et al. |
| 6,384,736 B1 | 5/2002 | Gothard |
| 6,421,694 B1 | 7/2002 | Nawaz et al. |
| 6,509,911 B1 | 1/2003 | Shimotono |
| 6,546,294 B1 | 4/2003 | Kelsey et al. |
| 6,553,336 B1 | 4/2003 | Johnson et al. |
| 6,556,258 B1 | 4/2003 | Koshida et al. |
| 6,587,525 B2 | 7/2003 | Jeong et al. |
| 6,701,143 B1 | 3/2004 | Dukach et al. |
| 6,753,842 B1 | 6/2004 | Williams et al. |
| 6,771,795 B1 | 8/2004 | Isnardi |
| 6,812,851 B1 | 11/2004 | Dukach et al. |
| 6,850,209 B2 | 2/2005 | Mankins et al. |
| 6,968,375 B1 | 11/2005 | Brown |
| 7,038,186 B2 | 5/2006 | De Brabander et al. |
| 7,064,672 B2 | 6/2006 | Gothard |
| 7,319,862 B1 | 1/2008 | Lincoln et al. |
| 7,330,002 B2 | 2/2008 | Joung |
| 7,369,058 B2 | 5/2008 | Gothard |
| 7,380,265 B2 | 5/2008 | Jensen et al. |
| 7,391,317 B2 | 6/2008 | Abraham et al. |
| 7,451,332 B2 | 11/2008 | Culbert et al. |
| 7,474,294 B2 | 1/2009 | Leo et al. |
| 7,516,223 B2 | 4/2009 | Whitehead |
| 7,577,458 B2 | 8/2009 | Lin |
| 7,581,094 B1 | 8/2009 | Apostolopoulos et al. |
| 7,595,785 B2 | 9/2009 | Jang |
| 7,612,278 B2 | 11/2009 | Sitrick et al. |
| 7,614,065 B2 | 11/2009 | Weissmueller, Jr. et al. |
| 7,636,927 B2 | 12/2009 | Zigmond et al. |
| 7,675,862 B2 | 3/2010 | Pham et al. |
| 7,751,813 B2 | 7/2010 | Varanda |
| 7,764,280 B2 | 7/2010 | Shiina |
| 7,774,633 B1 | 8/2010 | Harrenstien et al. |
| 7,795,821 B2 | 9/2010 | Jun |
| 7,889,852 B2 | 2/2011 | Whitehead |
| 7,949,893 B1 | 5/2011 | Knaus et al. |
| 8,189,134 B2 | 5/2012 | LeCave |
| 8,212,921 B2 | 7/2012 | Yun |
| 8,218,812 B2 | 7/2012 | Sugimoto et al. |
| 8,248,203 B2 | 8/2012 | Hanwright et al. |
| 8,441,574 B2 | 5/2013 | Dunn et al. |
| 8,601,252 B2 | 12/2013 | Mendelow et al. |
| 8,612,608 B2 | 12/2013 | Whitehead |
| 8,654,302 B2 | 2/2014 | Dunn et al. |
| 8,689,343 B2 | 4/2014 | De Laet |
| 8,767,165 B2 | 7/2014 | Dunn |
| 8,854,595 B2 | 10/2014 | Dunn |
| 8,983,385 B2 | 3/2015 | Macholz |
| 9,026,686 B2 | 5/2015 | Dunn et al. |
| 9,812,047 B2 | 11/2017 | Schuch et al. |
| 10,120,498 B2 | 11/2018 | Gray |
| 10,170,076 B2 | 1/2019 | Wang et al. |
| 10,296,108 B2 | 5/2019 | Gray et al. |
| 10,325,536 B2 | 6/2019 | Schuch et al. |
| 10,353,785 B2 | 7/2019 | Dunn et al. |
| 10,593,175 B1 | 3/2020 | Jennings et al. |
| 10,908,863 B2 | 2/2021 | Newnham et al. |
| 11,093,355 B2 | 8/2021 | Dunn et al. |
| 2002/0019933 A1 | 2/2002 | Friedman et al. |
| 2002/0026354 A1 | 2/2002 | Shoji et al. |
| 2002/0065046 A1 | 5/2002 | Mankins et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0152425 A1 | 10/2002 | Chaiken et al. |
| 2002/0163513 A1 | 11/2002 | Tsuji |
| 2002/0163916 A1 | 11/2002 | Oskouy et al. |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0097497 A1 | 5/2003 | Esakov |
| 2003/0098881 A1 | 5/2003 | Nolte et al. |
| 2003/0115591 A1 | 6/2003 | Weissmueller, Jr. et al. |
| 2003/0117714 A1 | 6/2003 | Nakamura et al. |
| 2003/0161354 A1 | 8/2003 | Bader et al. |
| 2003/0177269 A1 | 9/2003 | Robinson et al. |
| 2003/0192060 A1 | 10/2003 | Levy |
| 2003/0196208 A1 | 10/2003 | Jacobson |
| 2003/0214242 A1 | 11/2003 | Berg-johansen |
| 2003/0230991 A1 | 12/2003 | Muthu et al. |
| 2004/0036697 A1 | 2/2004 | Kim et al. |
| 2004/0138840 A1 | 7/2004 | Wolfe |
| 2004/0158872 A1 | 8/2004 | Kobayashi |
| 2004/0194131 A1 | 9/2004 | Ellis et al. |
| 2004/0243940 A1 | 12/2004 | Lee et al. |
| 2004/0252400 A1 | 12/2004 | Blank et al. |
| 2004/0253947 A1 | 12/2004 | Phillips et al. |
| 2005/0033840 A1 | 2/2005 | Nisani et al. |
| 2005/0070335 A1 | 3/2005 | Jitsuishi et al. |
| 2005/0071252 A1 | 3/2005 | Henning et al. |
| 2005/0073518 A1 | 4/2005 | Bontempi |
| 2005/0088984 A1 | 4/2005 | Chin et al. |
| 2005/0123001 A1 | 6/2005 | Craven et al. |
| 2005/0132036 A1 | 6/2005 | Jang et al. |
| 2005/0179554 A1 | 8/2005 | Lu |
| 2005/0184983 A1 | 8/2005 | Brabander et al. |
| 2005/0216939 A1 | 9/2005 | Corbin |
| 2005/0231457 A1 | 10/2005 | Yamamoto et al. |
| 2005/0267943 A1 | 12/2005 | Castaldi et al. |
| 2005/0289061 A1 | 12/2005 | Kulakowski et al. |
| 2005/0289588 A1 | 12/2005 | Kinnear |
| 2006/0007107 A1 | 1/2006 | Ferguson |
| 2006/0022616 A1 | 2/2006 | Furukawa et al. |
| 2006/0150222 A1 | 7/2006 | McCafferty et al. |
| 2006/0160614 A1 | 7/2006 | Walker et al. |
| 2006/0269216 A1 | 11/2006 | Wiemeyer et al. |
| 2007/0039028 A1 | 2/2007 | Bar |
| 2007/0154060 A1 | 7/2007 | Sun |
| 2007/0157260 A1 | 7/2007 | Walker |
| 2007/0168539 A1 | 7/2007 | Day |
| 2007/0200513 A1 | 8/2007 | Ha et al. |
| 2007/0214812 A1 | 9/2007 | Wagner et al. |
| 2007/0237636 A1 | 10/2007 | Hsu |
| 2007/0268241 A1 | 11/2007 | Nitta et al. |
| 2007/0273519 A1 | 11/2007 | Ichikawa et al. |
| 2007/0274400 A1 | 11/2007 | Murai et al. |
| 2007/0286107 A1 | 12/2007 | Singh et al. |
| 2007/0291198 A1 | 12/2007 | Shen |
| 2008/0008471 A1 | 1/2008 | Dress |
| 2008/0019147 A1 | 1/2008 | Erchak et al. |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0096559 A1 | 4/2008 | Phillips et al. |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Tanni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |

(56) References Cited

U.S. PATENT DOCUMENTS

| | | |
|---|---|---|
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0043966 A1 | 2/2010 | Dunn et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1 | 11/2011 | Schuch et al. |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0162908 A1 | 6/2013 | Son et al. |
| 2013/0173358 A1 | 7/2013 | Pinkus |
| 2014/0002747 A1 | 1/2014 | Macholz |
| 2015/0193074 A1 | 7/2015 | Cudak et al. |
| 2015/0250021 A1 | 9/2015 | Stice et al. |
| 2016/0034240 A1 | 2/2016 | Kreiner et al. |
| 2017/0075777 A1 | 3/2017 | Dunn et al. |
| 2017/0163519 A1 | 6/2017 | Bowers et al. |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0027635 A1 | 1/2018 | Roquemore, III |
| 2018/0061297 A1 | 3/2018 | Schuch et al. |
| 2018/0181091 A1 | 6/2018 | Funk et al. |
| 2018/0268783 A1 | 9/2018 | Woo |
| 2018/0364858 A1 | 12/2018 | Gray |
| 2018/0364859 A1 | 12/2018 | Gray |
| 2018/0364860 A1 | 12/2018 | Gray |
| 2018/0364861 A1 | 12/2018 | Gray |
| 2019/0087042 A1 | 3/2019 | Van Ostrand et al. |
| 2019/0171331 A1 | 6/2019 | Gray et al. |
| 2019/0258552 A1 | 8/2019 | Dunn et al. |
| 2020/0012383 A1* | 1/2020 | Wang ............... G06F 3/0412 |
| 2020/0019363 A1 | 1/2020 | Newnham et al. |
| 2020/0272269 A1 | 8/2020 | Dunn |
| 2021/0117143 A1 | 4/2021 | Newnham et al. |

FOREIGN PATENT DOCUMENTS

| | | |
|---|---|---|
| EP | 0313331 B1 | 2/1994 |
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| JP | 2018537876 A | 12/2018 |
| JP | 6639653 B2 | 1/2020 |
| KR | 10-2010-0081354 A | 7/2010 |
| KR | 10-2011-0065338 A | 6/2011 |
| KR | 10-2056069 B1 | 12/2019 |
| WO | WO9608892 A1 | 3/1996 |
| WO | WO2008050402 A1 | 5/2008 |
| WO | WO2011106683 | 9/2011 |
| WO | WO2012/127971 A1 | 9/2012 |
| WO | WO2017044952 A1 | 3/2017 |
| WO | WO2020/176416 A1 | 9/2020 |

OTHER PUBLICATIONS

Texas Advanced Optoelectronic Solutions, TCS230 Programmable Color Light-to-Frequency Converter, 2007, 12 Pages.

Don Methven, Wireless Video Streaming: An Overview, Nov. 16, 2002, 7 Pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

Sigmasense, Analog can't touch Digital homepage, Jan. 23, 2019, 5 pages.

Jim Tuley, EEJournal—SigmaSence ICCI Goes Big, article, Jan. 8, 2019, 3 pages.

Sigmasense, Solutions webpage, Jan. 23, 2019, 4 pages.

Sigmasense, Technology webpage, Jan. 23, 2019, 3 pages.

Rouaissia, C., Adding Proximity Detection to a Standard Analog-Resistive Touchscreen, SID 2012 Digest, 2012, 1564-1566, p. 132.

\* cited by examiner

MONITORING THE STATUS OF A TOUCHSCREEN

CROSS-REFERENCE TO RELATED APPLICATIONS

This application is a continuation-in-part of U.S. application Ser. No. 16/799,377 filed Feb. 24, 2020, which claims the benefit of U.S. Provisional Patent Application Ser. No. 62/810,155 filed Feb. 25, 2019, the disclosures of each of which are hereby incorporated by reference as if fully restated herein.

TECHNICAL FIELD

Exemplary embodiments relate generally to systems and methods for monitoring the status of a touchscreen.

BACKGROUND AND SUMMARY OF THE INVENTION

Increasing supply and decreasing costs have resulted in a greater utilization of touchscreen technology. Such touchscreens are increasingly being used in a number of applications. One such exemplary application is the digital out of home ("DOOH") advertising industry. DOOH applications include indoor, semi-outdoor, and outdoor digital signage.

Some touchscreens require physical depression (e.g., resistive type), while others require contact with a conductive item (e.g., capacitive type). Some touchscreens suffer from inaccurate touch capture, some have slow response speeds, and many touchscreens are only capable of receiving a limited number of touch inputs at a given time. The use of sigma-delta modulation technology and/or in-cell concurrent capacitive imaging (herein interchangeably referred to as "ICCI") may overcome some or all of these, and other, deficiencies. Such ICCI technology is available from, for example without limitation, SigmaSense, LLC of Austin Tex. (see sigmasense.com). Such ICCI technology may comprise, for example without limitation, systems and method which energize an entire touchscreen array while the touchscreen is operated and monitor for signal reflections. The touchscreen's steady-state behavior may be monitored and used as a baseline to determine anomalous behavior, such as user input.

Touchscreens, particularly those in DOOH applications, may be exposed to harsh conditions. Such harsh conditions may include, for example without limitation, vandalism, smudging, wildlife, other environmental hazards, rain, sun, sleet, snow, high winds, other weather conditions, accidents, some combination thereof, or the like. Such harsh conditions may cause damage affecting the touchscreen's functionality and may result in operational downtime. Even if such damage does not affect functionality of the touchscreen, it may affect visibility—which can impact revenue, especially in the DOOH market.

Even if a touchscreen is remotely monitored, not all damage will be sufficient to trigger an alert. For example, such alerts may be generated only upon certain failure type events. Systems may not exist to monitor for other levels of damage such as, but not limited to, surface scratches, smudges, obstructions, screen cracks, or similar. Furthermore, even if an alert is generated, there is insufficient information provided to determine the type of damage to the touchscreen. For example, a remote user may be unable to determine if the whole unit needs replaced, and therefore a skilled team with replacement parts needs to be dispatched to make the repair, or if the unit is only lightly damaged in an easily repaired fashion (e.g., excess smudging or bird excrement) which might require only an unskilled technician to wipe down the screen.

What is needed is a system and method for monitoring the status of a touchscreen. Systems and methods for monitoring the status of a touchscreen are provided. One or more display assemblies may be in communication with a network operations center. Each display assembly may comprise one or more touchscreens, one or more touchscreen controllers, and a network communications device. The touchscreens may utilize ICCI technology. The touchscreens may be monitored periodically, or continuously, for damage. Such monitoring may be reported in substantially real time. The presence of damage may be determined by detecting interruptions in the touchscreen signals distributed across the touchscreen by the touchscreen controller. For example, without limitation, persisting touch input at a given area may indicate a first type of damage, persistent signal interruption across a portion of the touchscreen may indicate a second type of damage, and persistent signal interruption to the entire touchscreen may indicate a third type of damage. The location of damage may be determined based on the area where the signal is interrupted. A visual representation of the touchscreen, along with a visual representation of damage thereto, may be generated. The visual representation may indicate the type and/or location of the damage.

It may be desirable to incorporate the touchscreen into a ruggedized subassembly. The touchscreen may comprise multiple components and/or layers which provide protection, improve optical quality, facilitate thermal management, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
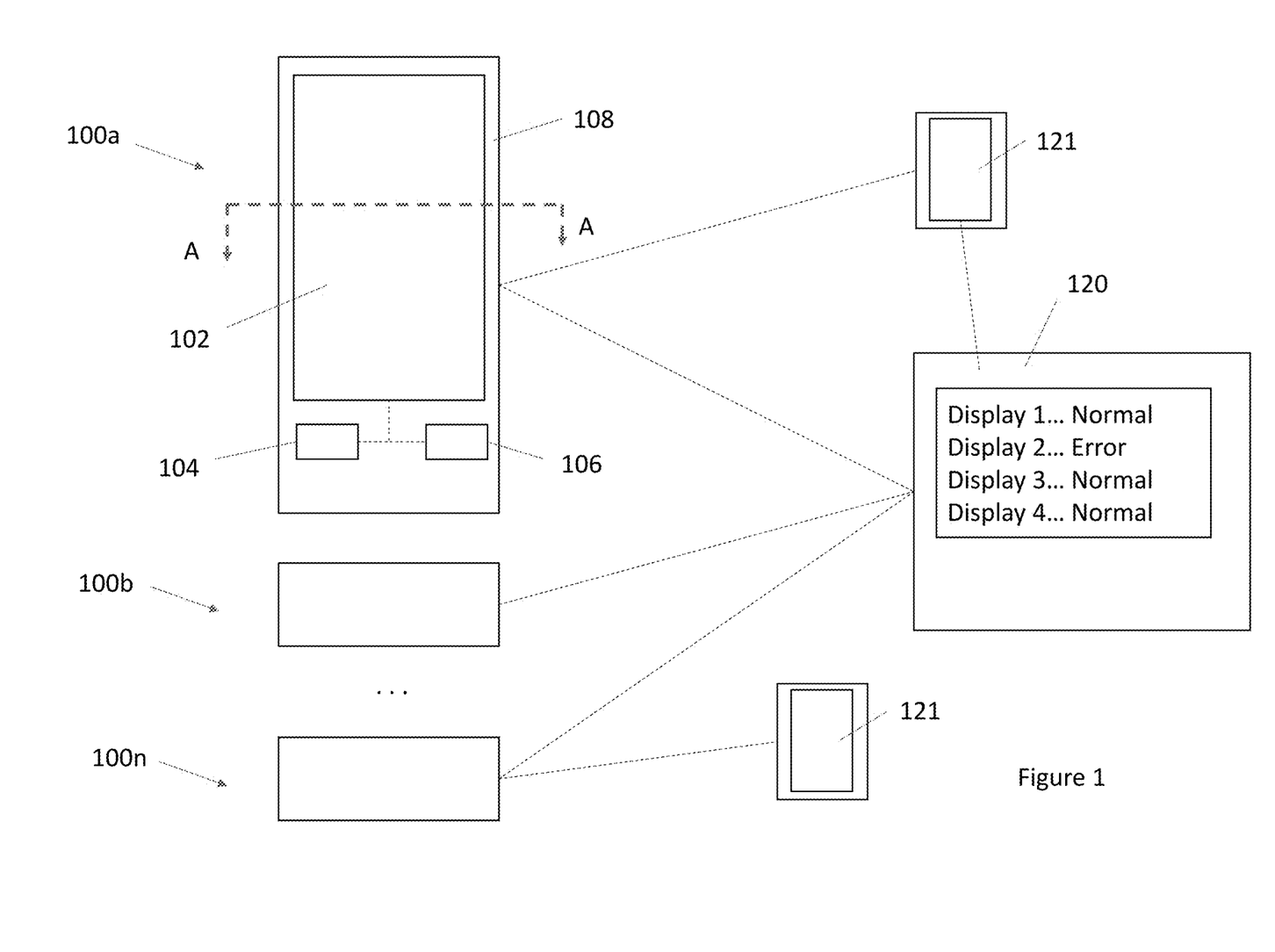
FIG. 1 is a simplified plan view of an exemplary system in accordance with the present invention.

FIG. 1 is a simplified plan view of an exemplary system in accordance with the present invention. One or more display assemblies 100a-100n may be placed in electronic communication with a network operations center 120. Any number, size, shape, type, orientation, and the like of display assemblies 100a-100n may be utilized. A network operations center 120 may comprise one or more electronic devices such as, but not limited to, personal computers, smartphones, tablets, electronic displays, some combination thereof, or the like. Alternatively, or additionally, one or more of the display assemblies 100a-100n may be placed in electronic communication with one or more remote electronic devices 121 operated outside of the network operations center 120.

Electronic communication with the display assemblies 100a-100n may be accomplished by way of network communication devices 106 located at each respective display assembly 100a-100n. Such electronic communication may be realized through wired connections, wireless connections, some combination thereof, or the like. Such networks may comprise internets, intranets, the world wide web, cellular networks, some combination thereof, or the like. Each display assembly 100a-100n may comprise one or more touchscreen electronic displays 102 (hereinafter also, touchscreens 102). The touchscreens 102 may comprise liquid crystal displays, organic light emitting diode displays, plasma displays, or the like. Furthermore, the touchscreens 102 may be directly backlit or edge lit. The touchscreens 102 may further comprise various anti-glare layers, anti-smudge layers, protective layers, and the like. In exemplary embodiments, the touchscreens 102 utilize ICCI technology, though any type of touchscreen technology may be utilized.

If a respective display assembly 100a-100n comprises more than one touchscreen 102. Such touchscreens 102 may be arranged back to back, side by side, above and below one another, some combination thereof, or the like. Each of the touchscreens 102 may be operable by way of touch input. A touchscreen controller 104 may be placed in electronic communication with one or more of the touchscreens 102 in a respective display assembly 100a-100n. Upon receipt of touch input at the touchscreen 102, the touchscreen controller 104 may command the touchscreen 102 to alter the image displayed thereon based upon the touch input as received and processed at the touchscreen controller 104. The touchscreen controller 104 may, alternatively or additionally, monitor for touch input at the one or more of the touchscreens 102.

Where a given display assembly 100a-100n comprises more than one touchscreen 102, more than one touchscreen controller 104 may be utilized, though such is not required. Each of the touchscreen controllers 104 may comprise software utilizing ICCI technology. Such ICCI technology and software may be available from, for example without limitation, SigmaSense, LLC of Austin Tex. (see sigmasense.com/). The touchscreen controllers 104 may be configured to monitor the touchscreens 102 for touch input and may change the image displayed on the respective touchscreen 102 in response to the received touch input. Activity recorded by the touchscreen controllers 104, and/or images displayed on the touchscreen 102, may be remotely monitored at the network operations center 120 and/or at other remotely located electronic devices 121 by way of the network communications device 106.

Each display assembly 100a-100n may comprise a housing 108. The housing 108 may partially or wholly enclose the electronic display(s) 102, the touchscreen controller(s) 104, and the network communication device 106 for the respective display assembly 100a-100n. The housing 108 may be ruggedized such that the display assembly 100a-100n may withstand various environmental conditions such as, but not limited to, rain, snow, wind, high temperatures, low temperatures, sunlight, hail, sleet, physical impact, vandalism, and the like.

Figure 2:
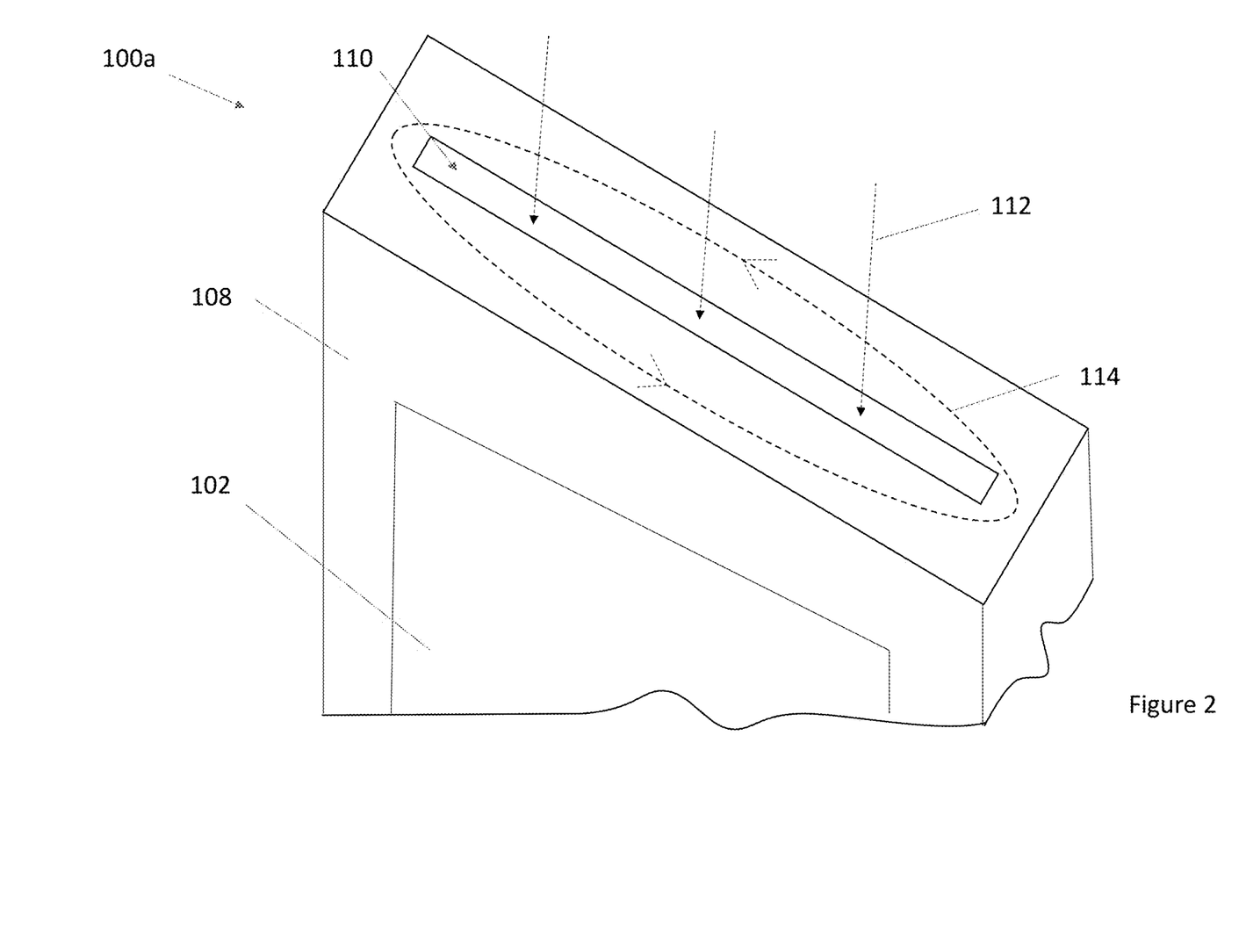
FIG. 2 is a detailed top perspective view of an exemplary display assembly for use with the system of FIG. 1.

FIG. 2 is a detailed top perspective view of an exemplary display assembly 100a. In exemplary embodiments, without limitation, such ruggedization may be accomplished by providing an open loop pathway for the ingestion and exhaustion of ambient air 112. Intake 110 and exhaust apertures may be provided on the display assemblies 100a-100n to facilitate the intake and exhaust of ambient air 112. One or more fans may be provided along the open loop pathway to facilitate the ingestion, exhaustion, and other movement of the ambient air 112. In exemplary embodiments, the open loop pathway travels along the rear surface of the backlight for the touchscreen 102, though such is not required.

A closed loop pathway for circulating air 114 may also be provided within the respective display assembly 100a-100n in exemplary embodiments, without limitation. The closed loop pathway may be in thermal communication with some or all of the components of the respective display assembly 100a-100n so as to remove heat generated by such components. The closed loop pathway may be placed in thermal communication with the open loop pathway to transfer heat from the circulating gas 114 to the ambient air 112. The ambient air 112 may also provide cooling for the display assembly 100a and various components thereof. Such thermal communication may be accomplished by way of an air to air heat exchanger. In this way, the circulating gas 114 may remain substantially free from contaminants that may otherwise be present in the ambient air 112. One or more fans may be provided along the closed loop pathway to facilitate the movement of the circulating gas 114. In exemplary embodiments, the closed loop pathway may pass between a transparent cover for, and a display surface of, the touchscreen 102. The various display assemblies 100a-100n may be the same or different from one another.

Figure 3A:
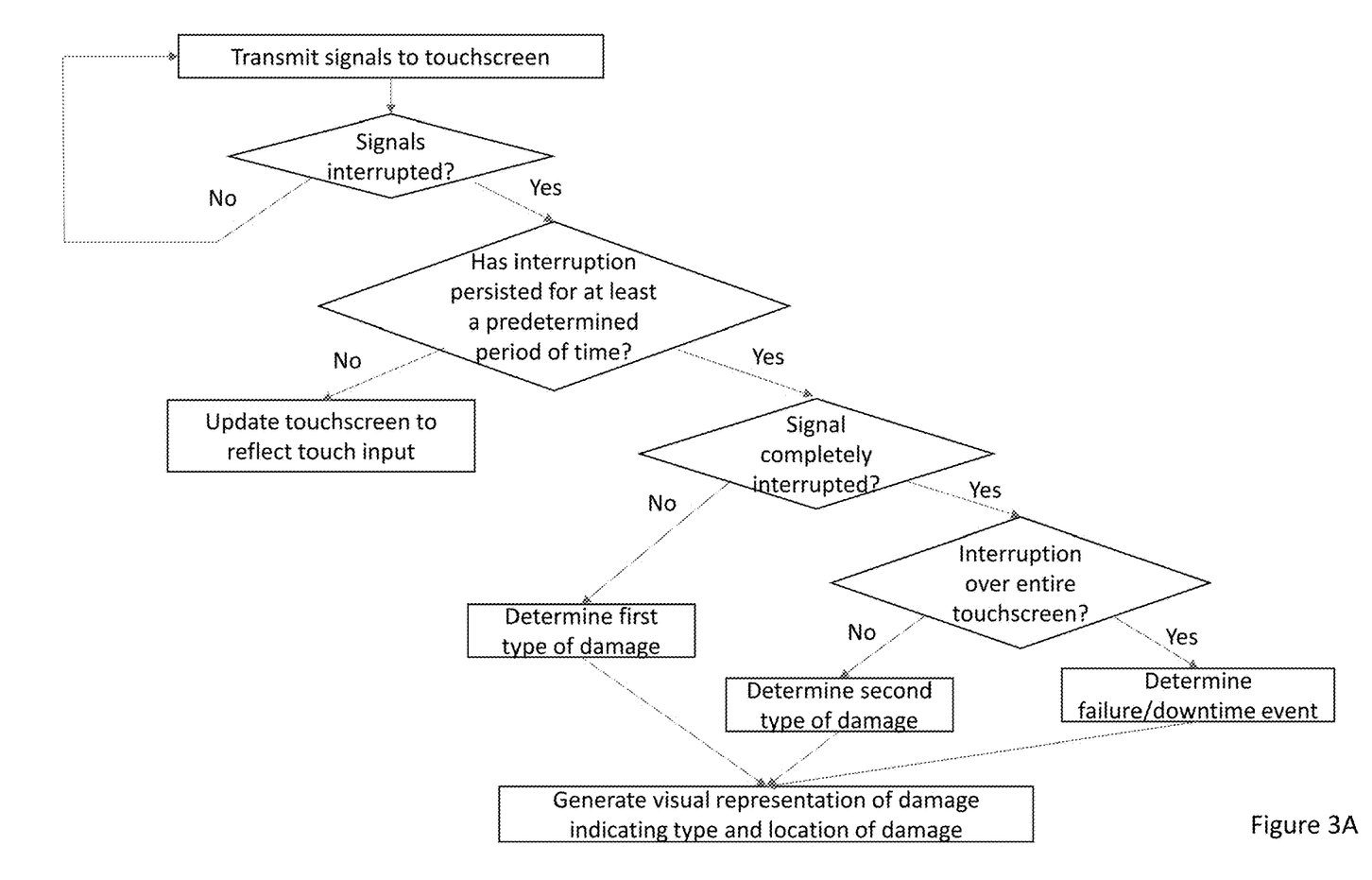
FIG. 3A is a flow chart illustrating exemplary logic for use with the system of FIG. 1.
Figure 3B:
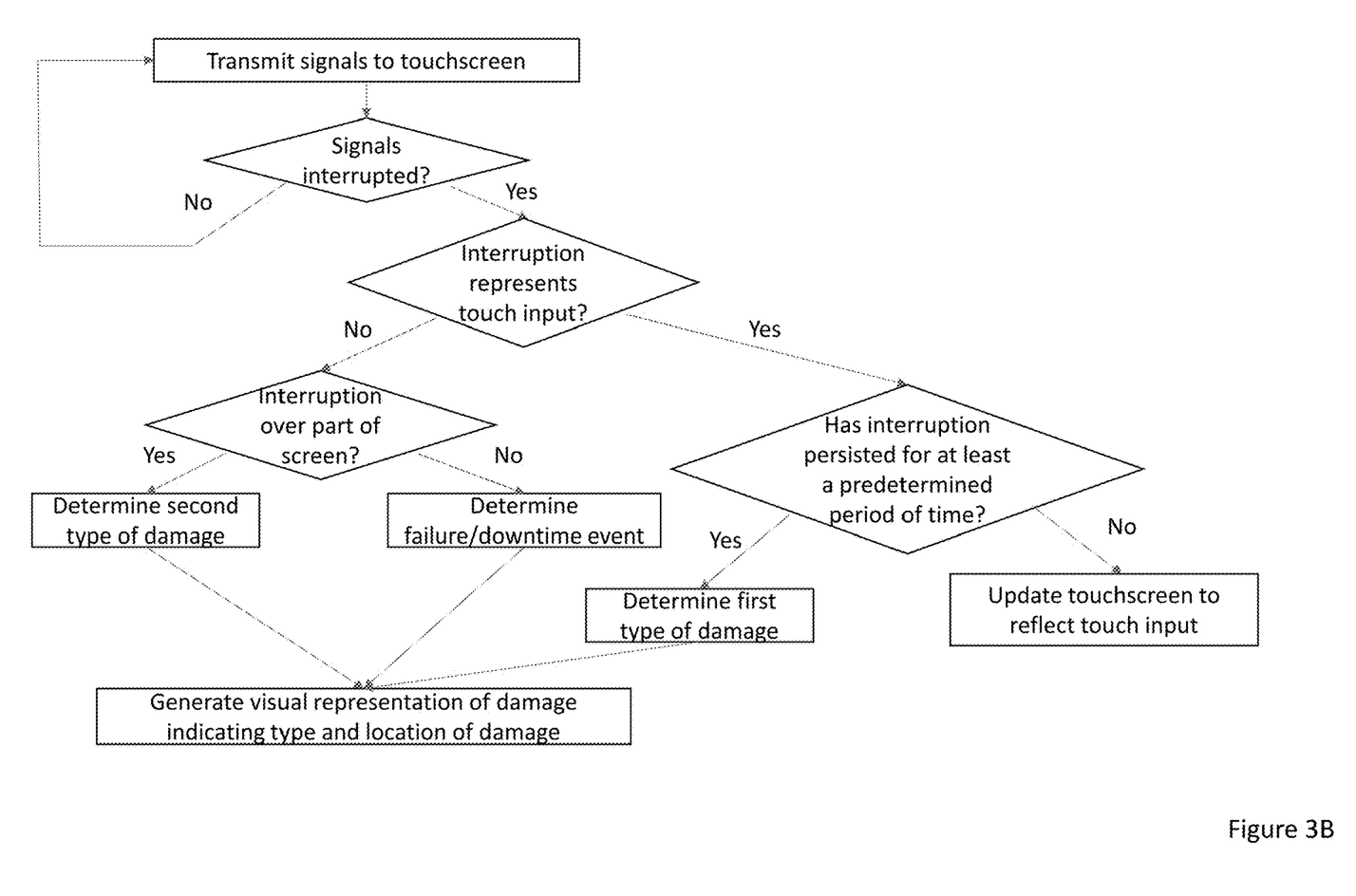
FIG. 3B is a flow chart illustrating other exemplary logic for use with the system of FIG. 1.

FIG. 3A and FIG. 3B are flow charts illustrating exemplary logic for use with the system of FIG. 1. The touchscreen controllers 104 may periodically or continuously transmit signals to the touchscreens 102 and monitor for interruptions. To so monitor the touchscreens 102, the touchscreen controllers 104 may continuously or periodically disburse signals across the touchscreens 102 and monitor the received signals for weakness, interruption, or other irregularities.

Referring particularly to FIG. 3A, if such signals are wholly or partially interrupted for less than a predetermined period of time, then the touchscreen controllers 104 may determine that touch input has been received and adjust the image displayed on the touchscreen based on the received touch input. However, if such signals are wholly or partially interrupted for more than the predetermined period of time, the touchscreen controllers 104 may determine that damage has been detected.

If damage is detected, the type and location of the damage may be identified. Identification of the type of damage may be achieved by determining the level of interference with touchscreen signals being generated and transmitted across the touchscreen 102 by the touchscreen controllers 104. For example, without limitation, if a signal is only partially interrupted or weakened, it may be determined that a first type of damage has occurred. Such first types of damage may include, for example without limitation, surface obstructions. If a signal is completely interrupted, it may be determined that a second type of damage has occurred. Such second types of damage may include, for example without limitation, scratches, cracks, or other physical damage. If no signals are returned whatsoever, it may be determined that a third type of damage has occurred. Such third types of damage may include, for example without limitation, failure or downtime events.

Alternatively, or additionally, and referring particularly to FIG. 3B, if such signal interruptions represent touch input and such interruption has not persisted for at least the predetermined period of time, the touchscreen controllers 104 may determine that touch input has been received and adjust the image displayed on the touchscreen based on the received touch input. The touchscreen controllers 104 may, for example without limitation, determined that the interruption constitutes touch input where the interruption is consistent with other touch inputs received. However, if the interruption is consistent with touch input and has persisted for more than a predetermined period of time, the touchscreen controllers 104 may determine that the first type of damage has occurred.

If such signal interruptions do not represent touch input, the touchscreen controllers 104 may determine if the interruption is over part of all of the touchscreen 102. The touchscreen controllers 104 may, for example without limitation, determined that the interruption does not constitute touch input where the interruption indicates missing signals, scrambled signals, some combination thereof, or the like. If the interruption is over part of the touchscreen 102, the touchscreen controllers 104 may determine that the second type of damage has occurred. If the interruption is over the enrage touchscreen 102, the touchscreen controllers 104 may determine that the third type of damage has occurred.

Identification of the location of the damage may be achieved by determining the locations on the touchscreen 102 where signals from the touchscreen controllers 104 are interrupted. The entire touchscreen 102 may be scanned to outline the area(s) where the signals are interrupted.

Figure 4A:
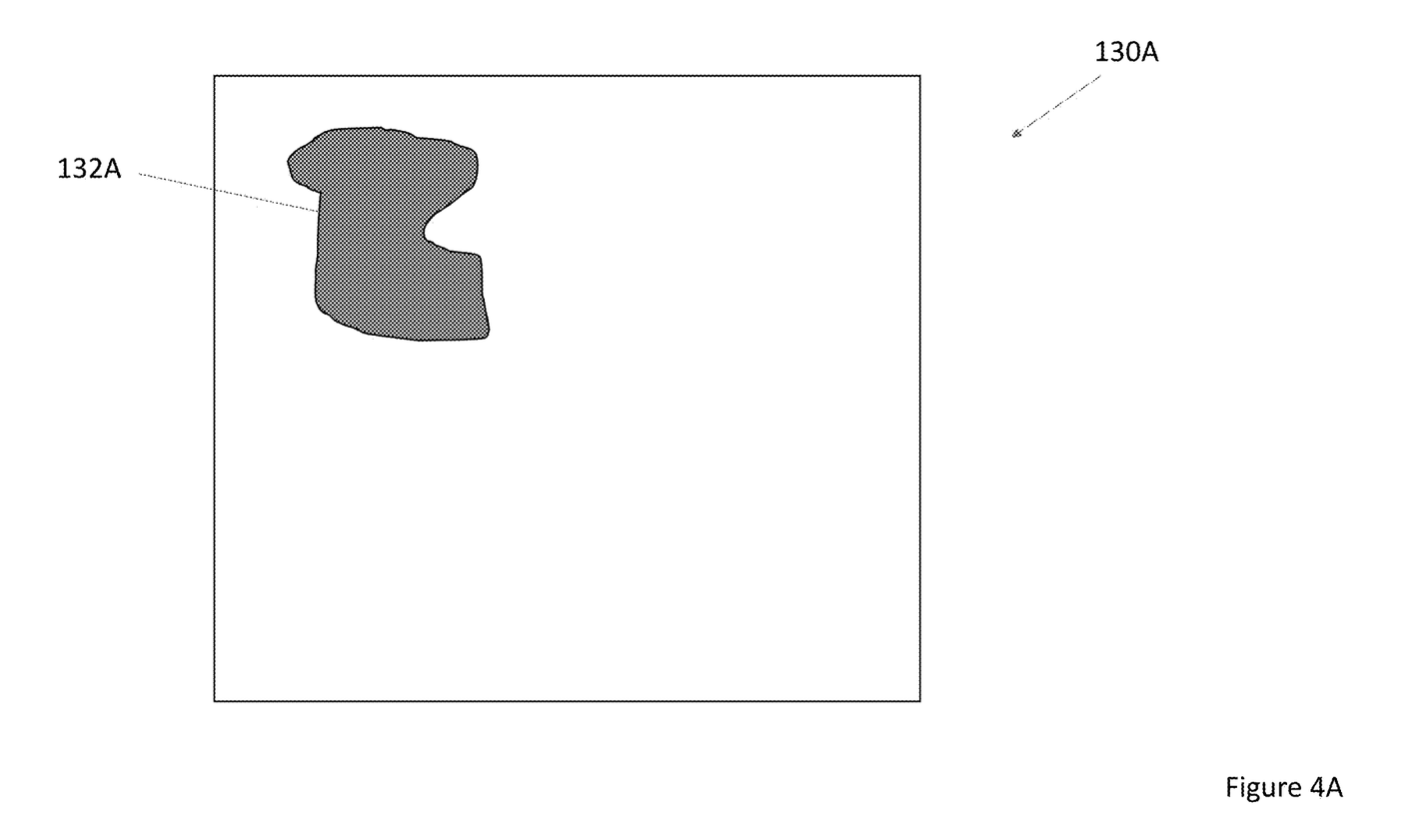
FIG. 4A is an exemplary visual representation of an exemplary touchscreen with a first type of damage.
Figure 4B:
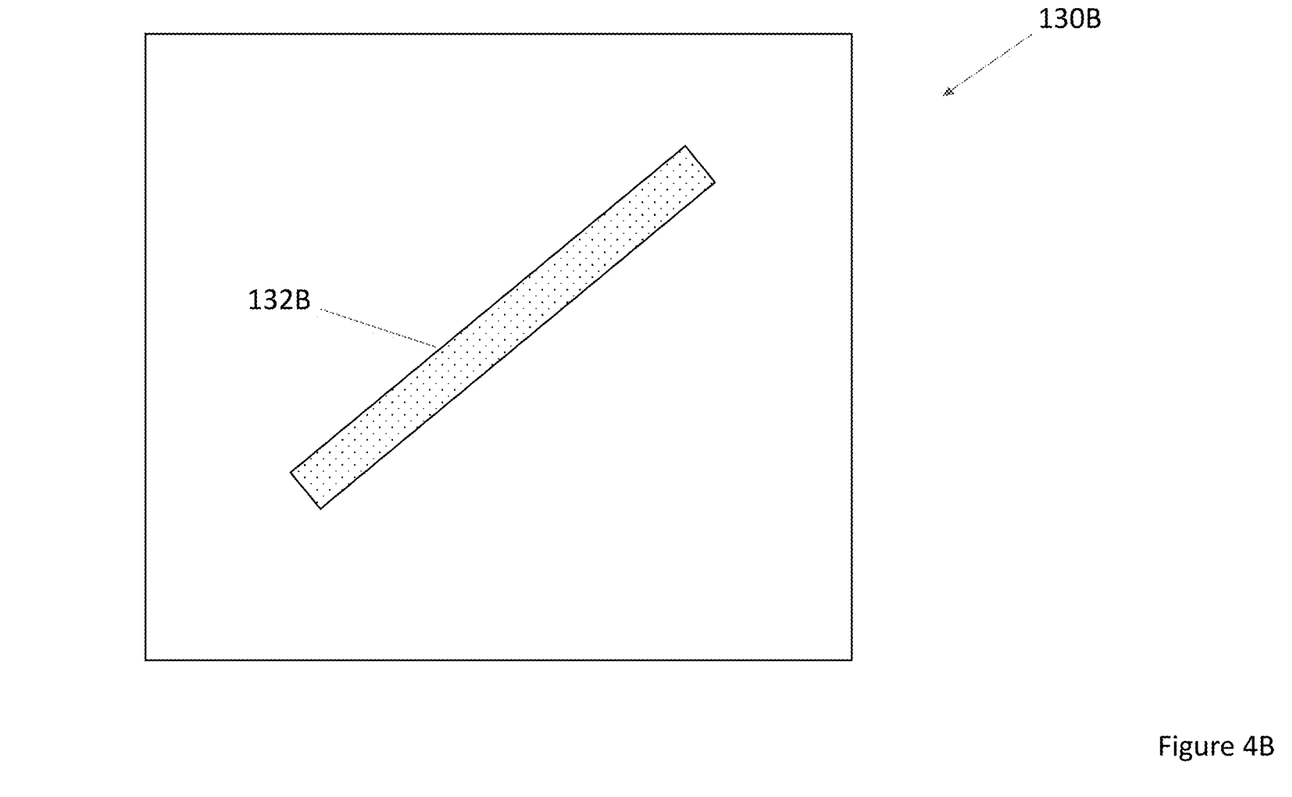
FIG. 4B is another exemplary visual representation of the exemplary touchscreen with a second type of damage.
Figure 4C:
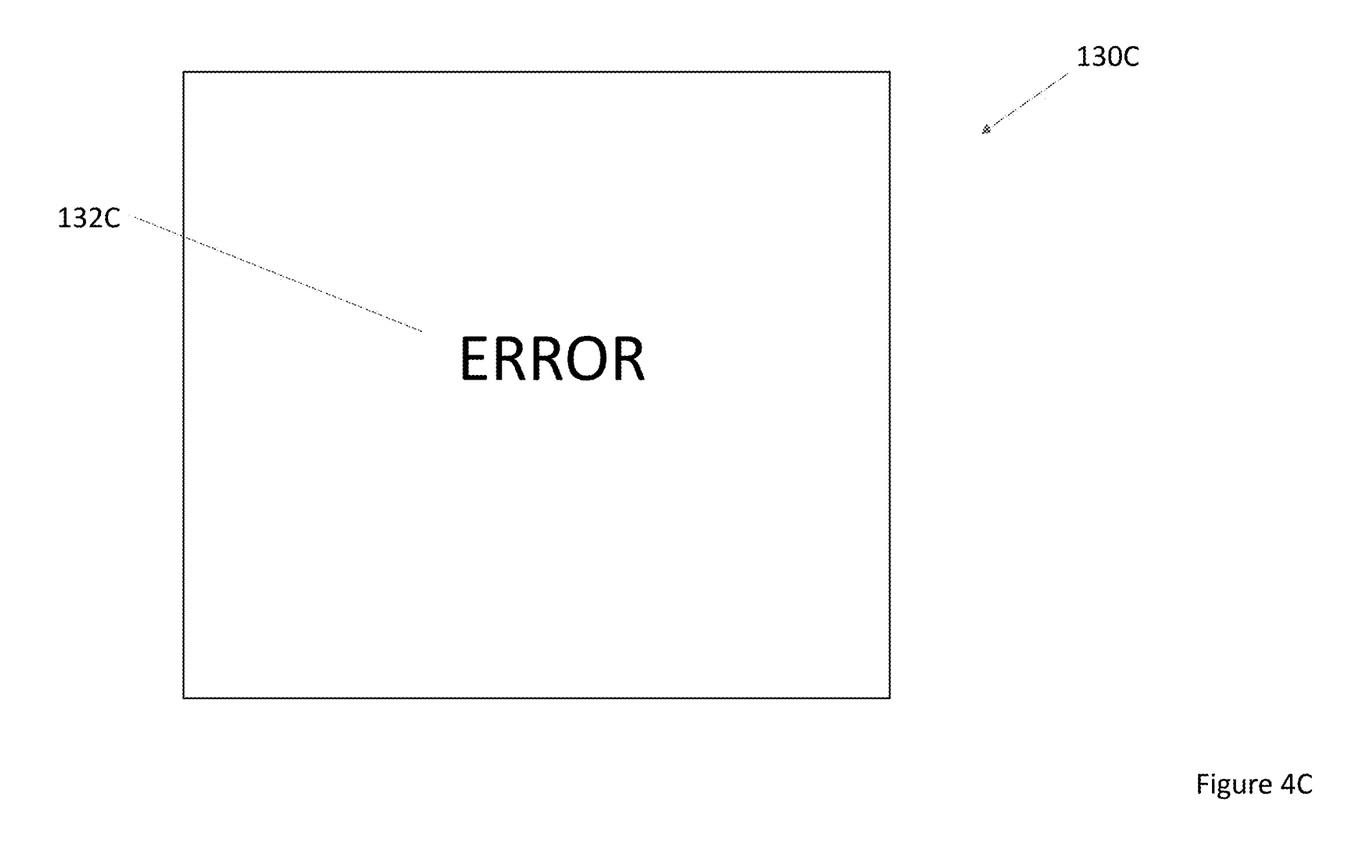
FIG. 4C is another exemplary visual representation of the exemplary touchscreen with a third type of damage.

FIG. 4A, FIG. 4B and FIG. 4C illustrate exemplary visual representations of the touchscreen 102 having a first, second, and third type of damage, respectively. At the network operations center 120, a visual representation 130 comprising one or more graphical representations of the type and location of damage 132 to the touchscreen 102 may be generated. The visual representation 130 may further comprise one or more graphical representations of the touchscreen 102 and/or the display assemblies 100. For example, without limitation, the visual representation of damage 132 may be color coded or otherwise patterned to indicate the severity of such damage. The visual representation of damage 132 may likewise be sized and scaled to represent the size, location, or other extent of the damaged area of the touchscreen 102. Further information may be provided in conjunction with the visual representation 130 such a, but not limited to, a textual description of the type and/or location of the damage 132, the location or other identifying information for the touchscreen 102, the location or other identifying information for the display assembly 100, part numbers for the touchscreen 102 or components thereof, some combination thereof, or the like. Repair efforts may be assigned and undertaken based on the visual representation 130. This may permit the proper personnel to be assigned to the repair effort, for the proper equipment and other resources to be allocated, and for the repair team to prepare for the repair efforts. Requests for repair may be automatically generated comprising the type and/or location of damage. The request for repair may comprise identifying information for the touchscreen 102, identifying information for the display assembly 100, part numbers for the touch screen 102, billing information, instructions, technical details, some combination thereof, or the like.

Referring to the example provided in FIG. 4A, the first type of damage may comprise surface obstructions, for example without limitation. The first type of damage may be illustrated on the visual representation 130A in the size and shape as they have occurred on the touchscreen 102. Such surface level obstructions may include, for example without limitation, excessive smudging, spilled liquids or other materials, bird or other wildlife droppings, paper, tape, some combination thereof, or the like. The first type of damage may be determined, for example without limitation, where signals corresponding to persistent touch input are received. In such cases, a request for repair may be transmitted to an unskilled or less skilled team. For example, without limitation, the repair request may comprise instructions to spray and wipe down the touchscreen 102 or otherwise check for and remove surface obstructions. The repair request may comprise, for example without limitation, the type of spray materials compatible with the touchscreen.

Referring to the example provided in FIG. 4B, the second type of damage may comprise scratches or other physical damage to the touchscreen 102, for example without limitation. The second type of damage may be illustrated on the visual representation 130B in the size and shape as they have occurred on the touchscreen 102. Such physical damage may be determined, for example without limitation, where persistent signal interruption is determined for part, but not all, of the touchscreen 102. In such cases, a request for repair may be transmitted to a skilled team or technician. The requests for repair in such cases may include, for example without limitation, one or more identifiers for replacement parts believed to be required based on the type of damage and the touchscreens 102 installed at the display assembly 100. Instructions for installation of the replacement parts may be provided with the repair request, for example without limitation.

Referring to the example provided in FIG. 4C, the third type of damage may comprise a complete failure or downtime of the touchscreen 102. The third type of damage may be illustrated on the visual representation 130C with an error message 132C, for example without limitation. Such failure may be determined where persistent signal interruption is determined for the entire touchscreen 102. The requests for repair in such cases may include, for example without limitation, one or more identifiers for replacement touchscreens 102 believed to be required based on the type of damage and the touchscreens 102 installed at the display assembly 100.

The damage 132 illustrated in the visual representation 130 may be color coded or patterned to indicate that the damage 132 is a first, second, or third type of damage. The visual representations 132 may be updated in substantially real time and such updates may be performed continuously or at any interval. The repair requests may request that photographic evidence be provided of completed jobs.

In exemplary embodiments, such as but not limited to, where the touchscreens 102 utilize ICCI technology, signal interruptions may be determined where received signals vary from an established steady-state behavior. Steady-state behavior may be determined by energizing an entire array for the touchscreen and monitoring the touchscreen for an initial period of time to establish steady-state behavior. Exemplary touch input may be provided to determine exemplary touch input. In such embodiments, comparisons may be made against exemplary touch input to determine signal interruptions which do or do not represent touch input. Regardless, where signal behavior varies from the established steady-state behavior, a determination may be made that the signal is interrupted. Alternatively, or additionally, signal interruption may be determined where no signals are received following transmission.

Any of the steps described herein may be performed in any order. Any of the steps may be repeated any number of times. Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may include the touchscreen controller 104 and/or may be personal computers, smartphone, tablets, databases, servers, or the like. The electronic connections and transmissions described herein may be accomplished by wired or wireless means.

Figure 5:
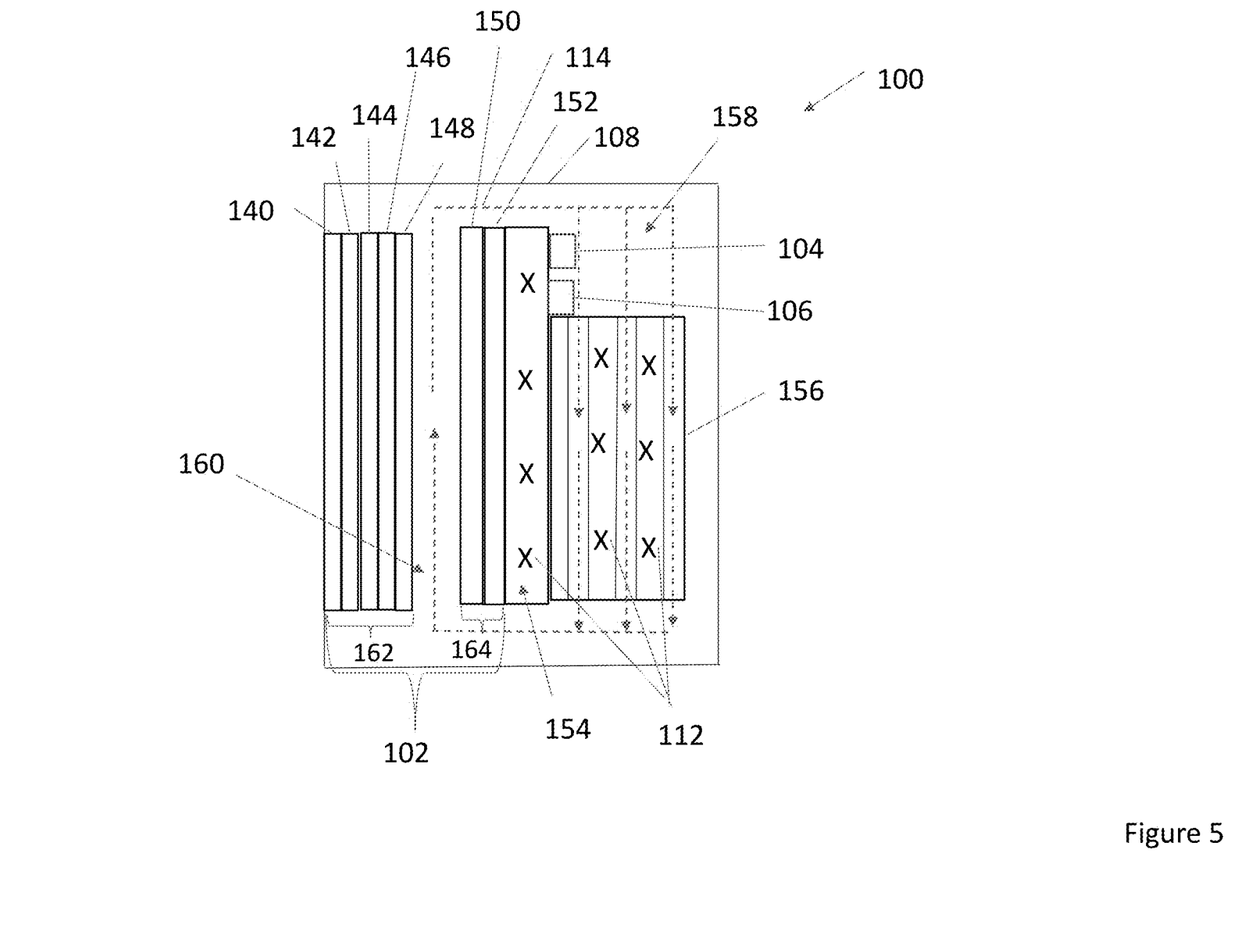
FIG. 5 is a top sectional view of the system of FIG. 1 taken along section line A-A.

FIG. 5 illustrates details of the touchscreen 102 of the display assembly 100. The touchscreen 102 may comprise multiple layers, some or all of which may be positioned adjacent to one another and/or some or all of which may be spaced apart from one another. In exemplary embodiments, without limitation, the touchscreen 102 comprises a front cover layer 140, a first layer of adhesive 142, a touch sensor layer 144, a second layer of adhesive 146, a rear cover layer 148, an electronic display layer 150, and a backlight 152. However, not all of the forementioned components or layers need be present, additional layers may be provided, and/or similar layers may be used in substitution. In exemplary embodiments, without limitation, the front cover layer 140 may form at least part of a front portion of the housing 108. The first and second layers of adhesive 142, 146 may comprise the same material, though such is not required. The first layer of adhesive 142 may be sandwiched between the front cover layer 140 and the touch sensor layer 144 to adhere the front cover layer 140 and the touch sensor layer 144. The second layer of adhesive 142 may be sandwiched between the touch sensor layer 144 and the rear cover layer 148 to adhere the touch sensor layer 144 to the rear cover 148.

The front cover layer 140, the first layer of adhesive 142, the touch sensor layer 144, the second layer of adhesive 146, and the rear cover layer 148 may form a first subassembly 162 in exemplary embodiments without limitation. The electronic display layer 150 and the backlight 152 may form a second subassembly 164 in exemplary embodiments without limitation. The rear cover layer 148 may be spaced apart from the electronic display layer 150 to define a front chamber 160 configured to receive, and permit passage of, the circulating air 114.

The circulating air 114 may extend within the housing 108 about at least the second subassembly 164 in exemplary embodiments. A rear chamber 158 may be located rearward of the touchscreen 102 to receive the circulating air 114 from the front chamber 160. The front chamber 160 may be fluidly connected to the rear chamber 158 to permit the circulating air 114 to circulate about the second subassembly 164. One or more fans may be provided, such as within or fluidly adjacent to, the rear chamber 158 to cause circulating of the circulating air 114 when activated.

An open loop chamber 154 for the ambient air 112 may be provided rearward of the backlight 152. The open loop chamber 152 may be provided directly adjacent to at least a portion of the backlight 152, though such is not required. The open loop chamber 152 may form part of the second subassembly 164 or may be separate. In exemplary embodiments, the circulating air 114 may extend rearward of the open loop chamber 152.

A heat exchanger 156 may be located in the rear chamber 158, though use of the heat exchanger 156 is not necessarily required. The heat exchanger 156 may comprise multiple layers, some of which are configured to receive the circulating air 114, and others of which are configured to receive ambient air 112.

The touchscreen controller 104, the network communication device 106, and/or other components for operating the display assembly 100 (e.g., processors, electronic storage devices, power supplies, video players, combinations thereof, or the like), may be located in the rear chamber 158, though such is not required.

The circulating air 114 need not necessarily be 100% sealed from the ambient air 112. It may be sufficient that the circulating air 114 is substantially separated from the ambient air 112. For example, without limitation, separation may be sufficient to meet various industry criteria including, but not limited to, IP65 and/or any one or more of the ingress protection ratings between IP50 and IP69K, such as defined by the International Electrotechnical Commission (available at: https://www.iec.ch/homepage), by way of nonlimiting example.

The front cover layer 140 may comprise glass. The front cover layer 140 may be between 5-7 mm thick in exemplary embodiments. The front cover layer 140 may comprise a titanium oxide and/or dioxide easy clean/anti-microbic topcoat over an anti-reflective coating on the front surface. A sintered frit mask (e.g., black) may be provided on a rear surface of the front cover layer 140. The mask may be provided in a picture frame form at the front cover layer 140.

The first layer of adhesive 142 may comprise one or more optically clear adhesives, which may be curable by UV light. The first layer of adhesive 142 may be between 1-2 mm thick, in exemplary embodiments.

The touch sensor layer 144 may comprise a glass substrate with double index matched ITO transmit rows on a first side and receiver columns on a second, opposing side in exemplary embodiments. The touch sensor layer may be between 1-2 mm thick in exemplary embodiments.

The second layer of adhesive 146 may comprise the same or different adhesive as the first layer of adhesive 142. The second layer of adhesive 146 may be between 1-2 mm thick, in exemplary embodiments.

The rear cover layer 148 may comprise glass. The rear cover layer 148 may be between 1-3 mm thick in exemplary embodiments. The rear cover layer 148 may comprise a titanium oxide and/or dioxide easy clean/anti-microbic topcoat over an anti-reflective coating on a rear surface.

The first subassembly 162 may form a projected capacitive sensor configured to receive touch input. The first subassembly 162 may have a final thickness of between 12-14 mm in exemplary embodiments.

The second subassembly 164 may form an electronic display configured to display images. The images may be displayed to correspond with touch input received from first subassembly 162. The first and second subassemblies 162, 164 may together form the touchscreen 102 and may provide an interactive touch experience in a ruggedized fashion which permits thermal management. The touchscreen controller 104 may be in electronic communication with some or all components of one or both of the first and second subassemblies 162, 164.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for monitoring the status of a touchscreen of a display assembly, said method comprising the steps of: receiving signals from the touchscreen of the display assembly; determining that the signals received from the touchscreen are modified in a manner inconsistent with expected touch input; determining a type and a location of damage to the touchscreen based on the signals received from the touchscreen; and generating a visual representation at a remote device of the type and the location of the damage at the touchscreen.

2. The method of claim 1 further comprising the steps of: generating a request for repair indicating the type of damage, the location of the damage, and identifying information for the display assembly.

3. The method of claim 2 wherein:
the signals received from the touchscreen indicate persistent touch input at an area of the touchscreen for at least a predetermined amount of time;
the type of the damage is determined to be a surface obstruction; and
the location of the damage is determined to be the area.

4. The method of claim 3 further comprising the steps of: transmitting said request for repair to an unskilled team.

5. The method of claim 2 wherein:
the signals received from the touchscreen indicate interruption in a manner inconsistent with expected touch input over an area of the touchscreen for at least a predetermined amount of time;
the type of the damage is determined to be physical damage; and
the location of the damage is determined to be the area of the persistent touch input.

6. The method of claim 5 further comprising the steps of: transmitting said request for repair to a skilled team, wherein said request for repair comprises one or more identifiers for replacement parts for the touchscreen.

7. The method of claim 2 wherein:
the signals received from the touchscreen indicate persistent interruption over an entire touch input area of said touchscreen for at least a predetermined amount of time;
the type of the damage is determined to be a failure event; and
the location of the damage is determined to be the entire touchscreen.

8. The method of claim 7 further comprising the steps of: transmitting said request for repair to a skilled team, wherein said request for repair comprises one or more identifiers for replacement touchscreens.

9. The method of claim 1 wherein:
said display assembly comprises an open loop pathway for ambient air.

10. The method of claim 9 wherein:
said display assembly comprises a closed loop pathway for circulating gas.

11. The method of claim 1 wherein:
said visual representation is displayed at a network operations center in electronic communication with said display assembly and comprising said remote device.

12. The method of claim 1 wherein:
said remote device comprises a personal electronic device in electronic communication with said display assembly; and
said visual representation is displayed at said personal electronic device.

13. The method of claim 1 wherein:
said touchscreen is configured to utilize in-cell concurrent capacitive imaging technology.

14. The method of claim 1 further comprising the steps of: energizing an entire array for the touchscreen during operation comprising providing expected touch input;
monitoring the touchscreen for an initial period of time to establish steady-state behavior during said operations; and
determining that signals to the touchscreen are modified in a manner inconsistent with expected touch input where signal input varies from the established steady-state behavior outside predetermined margins.

15. The method of claim 1 wherein:
the touchscreen comprises:
a first subassembly comprising:
a front cover layer;
a first layer of optically clear adhesive;
a touch sensor layer;
a second layer of optically clear adhesive; and
a rear cover layer; and
a second subassembly spaced apart from the first subassembly and comprising:
an electronic display layer; and
a backlight.

16. A system for monitoring the status of a touchscreen, said system comprising:
a housing for the touchscreen;
a touchscreen controller in electronic communication with the touchscreen;
a network communication device configured to facilitate electronic communication between the touchscreen controller and one or more remote electronic devices; and
one or more electronic storage devices comprising executable software instructions, which when executed, configure one or more processors to:
determine that the signals received from the touchscreen are modified in a manner inconsistent with expected touch input;
determine a type and a location of damage to the touchscreen based on the signals received from the touchscreen; and
transmit data sufficient to generate a visual representation at the one or more remote electronic devices of the type and the location of the damage at the touchscreen.

17. The system of claim 16 wherein:
said one or more electronic storage devices are located at the touchscreen controller.

18. The system of claim 16 wherein:
said one or more electronic storage devices are located at the one or more remote electronic devices.

19. The system of claim 16 further comprising:
additional executable software instructions located at the one or more electronic storage devices, which when executed configure one or more processors to:
determine that the type of damage is surface level damage where the received signals are consistent with persistent touch input at an area of the touchscreen for more than a predetermined amount of time and the location of the damage is the area;
determine that the type of damage is physical damage where the received signals are weakened, missing, or erroneous for a same or different area of the touchscreen for more than a same or different predetermined amount of time and the location of the damage is the same or different area; and
determine that the type of damage is a failure event where the received signals are weakened, missing, or erroneous signals for an entire touch input area of the touchscreen for more than a same or different predetermined amount of time, and the location of the damage is the entire touchscreen.

20. The system of claim 16 further comprising:
additional executable software instructions located at the one or more electronic storage devices, which when executed configure one or more processors to electronically generate and transmit a request for repair indicating the type of damage, the location of the damage, and identifying information for the display assembly.

21. The system of claim 16 wherein:
the touchscreen comprises:
a first subassembly comprising:
a front cover layer;
a first layer of optically clear adhesive;
a touch sensor layer;
a second layer of optically clear adhesive; and
a rear cover layer; and
a second subassembly spaced apart from the first subassembly and comprising:
an electronic display layer; and
a backlight.

22. The system of claim 21 further comprising:
an open loop pathway for ambient air comprising an open loop chamber extending along the backlight; and
a closed loop pathway for circulating gas comprising a front chamber located between the first subassembly and the second subassembly and a rear chamber located behind the second subassembly.

23. The system of claim 21 wherein:
said touch sensor layer is configured to utilize in-cell concurrent capacitive imaging technology.

24. A system for monitoring the status of a touchscreen, said system comprising:
a housing for the touchscreen, wherein the touchscreen comprises:
a first subassembly comprising:
a front cover layer;
a first layer of optically clear adhesive;
a touch sensor layer utilizing in-cell concurrent capacitive imaging technology;
a second layer of optically clear adhesive; and
a rear cover layer; and
a second subassembly spaced apart from the first subassembly and comprising:
an electronic display layer; and
a backlight;
a touchscreen controller in electronic communication with the touchscreen and comprising one or more electronic storage devices:
an open loop pathway for ambient air comprising an open loop chamber extending along the backlight;
a closed loop pathway for circulating gas comprising a front chamber located between the first subassembly and the second subassembly and a rear chamber located behind the second subassembly;
a network communication device configured to facilitate electronic communication between the touchscreen controller and one or more remote electronic devices; and
executable software instructions located at the one or more electronic storage devices, which when executed configure one or more processors to:
energize an entire array for the touchscreen during operation comprising providing expected touch input;
monitor the touchscreen for an initial period of time to establish steady-state behavior during said operations;
determine that signals to the touchscreen are modified in a manner inconsistent with expected touch input where signal input varies from the established steady-state behavior outside predetermined margins;

determine that surface level damage has occurred where modified signals consistent with persistent touch input are received at the touchscreen controller from the touchscreen for more than a predetermined amount of time for an area;

determine that physical damage has occurred where weakened, missing, or erroneous signals are received at the touchscreen controller from the touchscreen for the area for more than the predetermined amount of time;

determine that a failure event has occurred where weakened, missing, or erroneous signals are received at the touchscreen controller from the touchscreen for an entire touch input area of the touchscreen for more than the predetermined amount of time; and transmit data, by way of the network communication device to the one or more electronic devices, sufficient to generate, at the one or more electronic devices, a visual representation comprising one or more graphical representations of a type of damage and a location of damage.

\* \* \* \* \*

UNITED STATES PATENT AND TRADEMARK OFFICE
CERTIFICATE OF CORRECTION

PATENT NO. : 11,402,940 B2
APPLICATION NO. : 17/464569
DATED : August 2, 2022
INVENTOR(S) : Dunn It is certified that error appears in the above-identified patent and that said Letters Patent is hereby corrected as shown below:

On the Title Page

Page 2, Column 1, Item (56), References Cited, U.S. Patent Documents, please delete "6,556,258 B1 4/2003 Koshida et al." and insert -- 6,556,258 B1 4/2003 Yoshida et al. --.

Page 2, Column 2, Item (56), References Cited, U.S. Patent Documents, please delete "2008/0267328 A1 10/2008 Tanni et al." and insert -- 2008/0267328 A1 10/2008 Ianni et al. --.

Signed and Sealed this
Eighteenth Day of October, 2022

Katherine Kelly Vidal
*Director of the United States Patent and Trademark Office*